Figure 1:
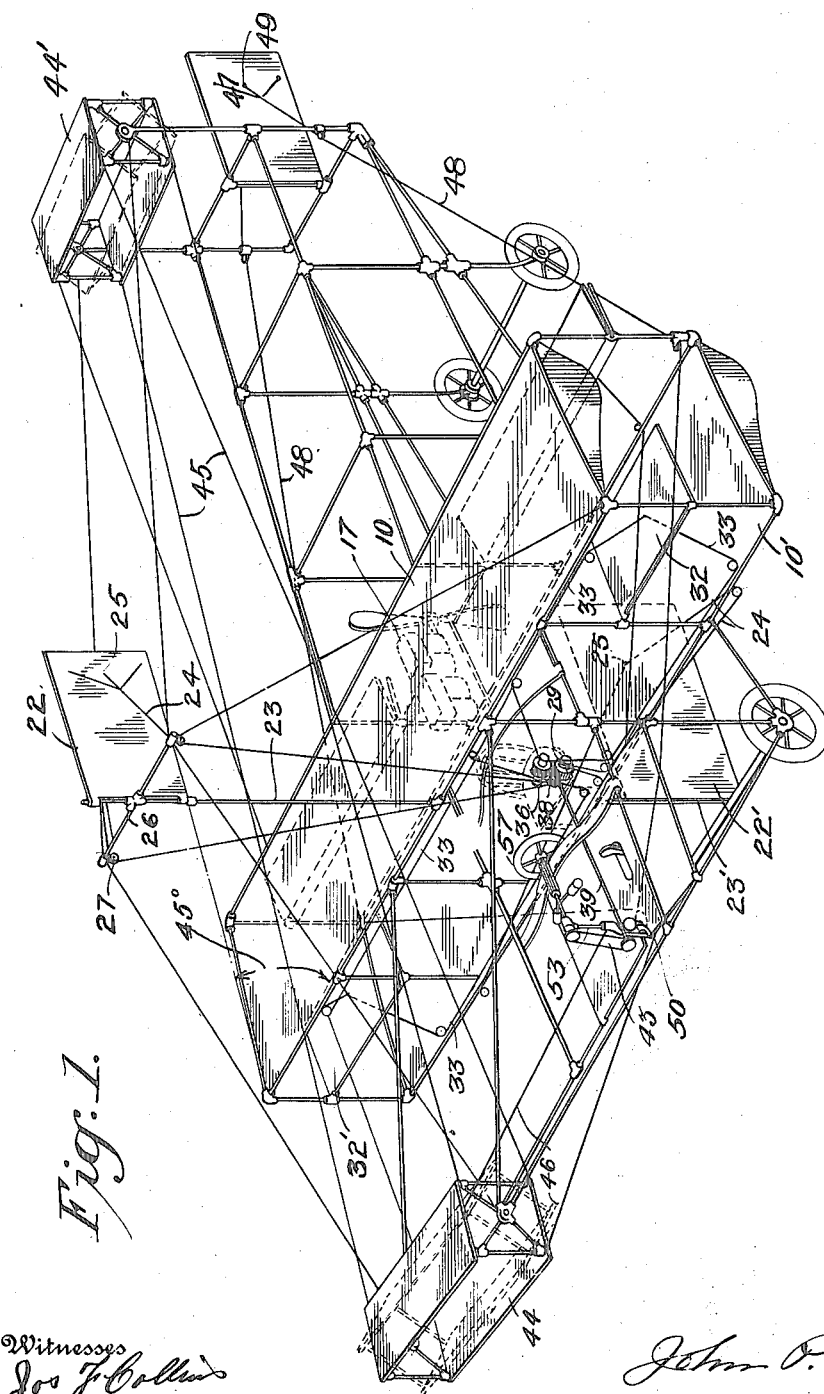

J. P. TARBOX.
AIRCRAFT.
APPLICATION FILED FEB. 10, 1911.

1,180,271.

Patented Apr. 18, 1916.
6 SHEETS—SHEET 1.

Witnesses
Jos. F. Collins
H. P. Hollingsworth

Inventor
John P. Tarbox
By
Attorney

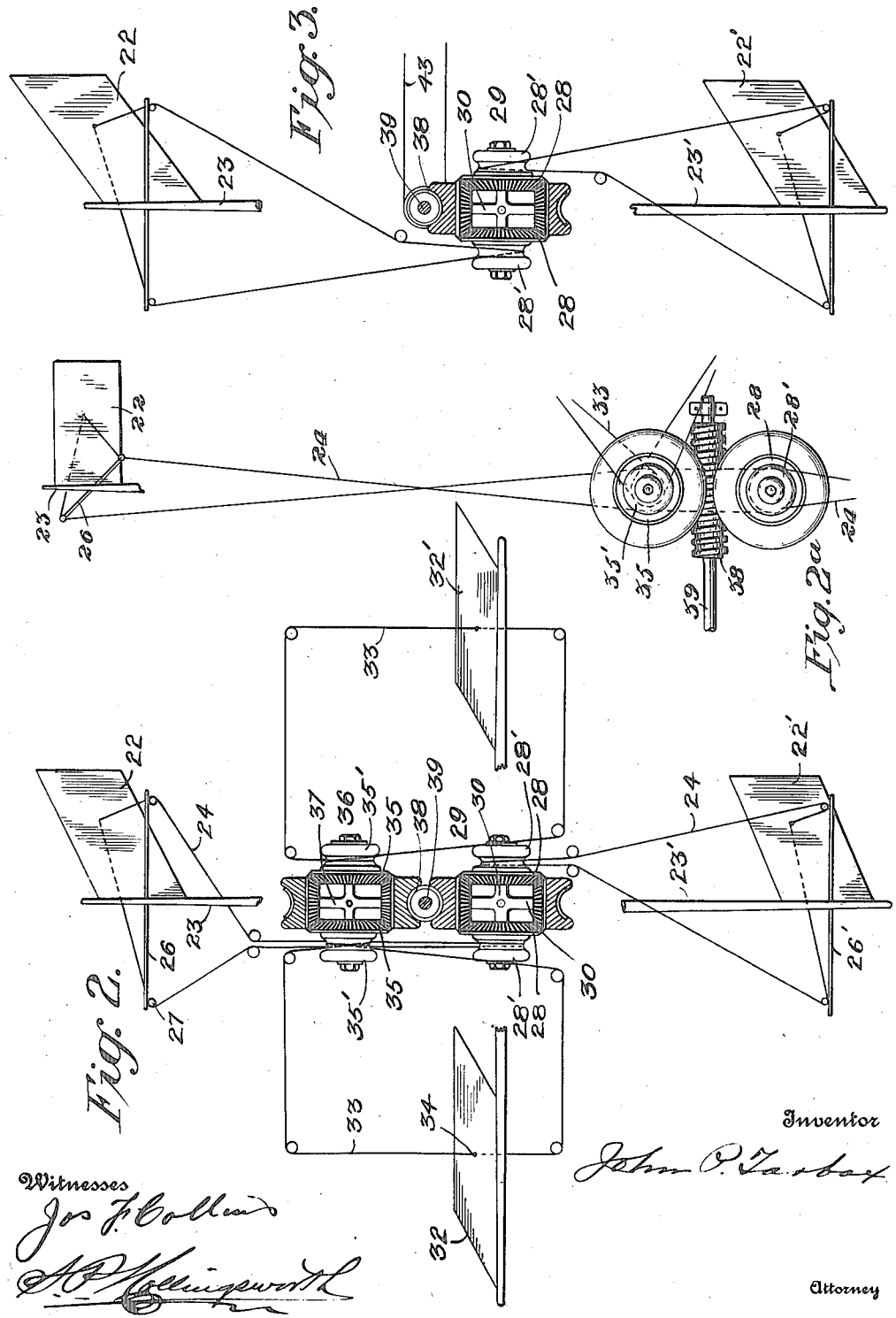

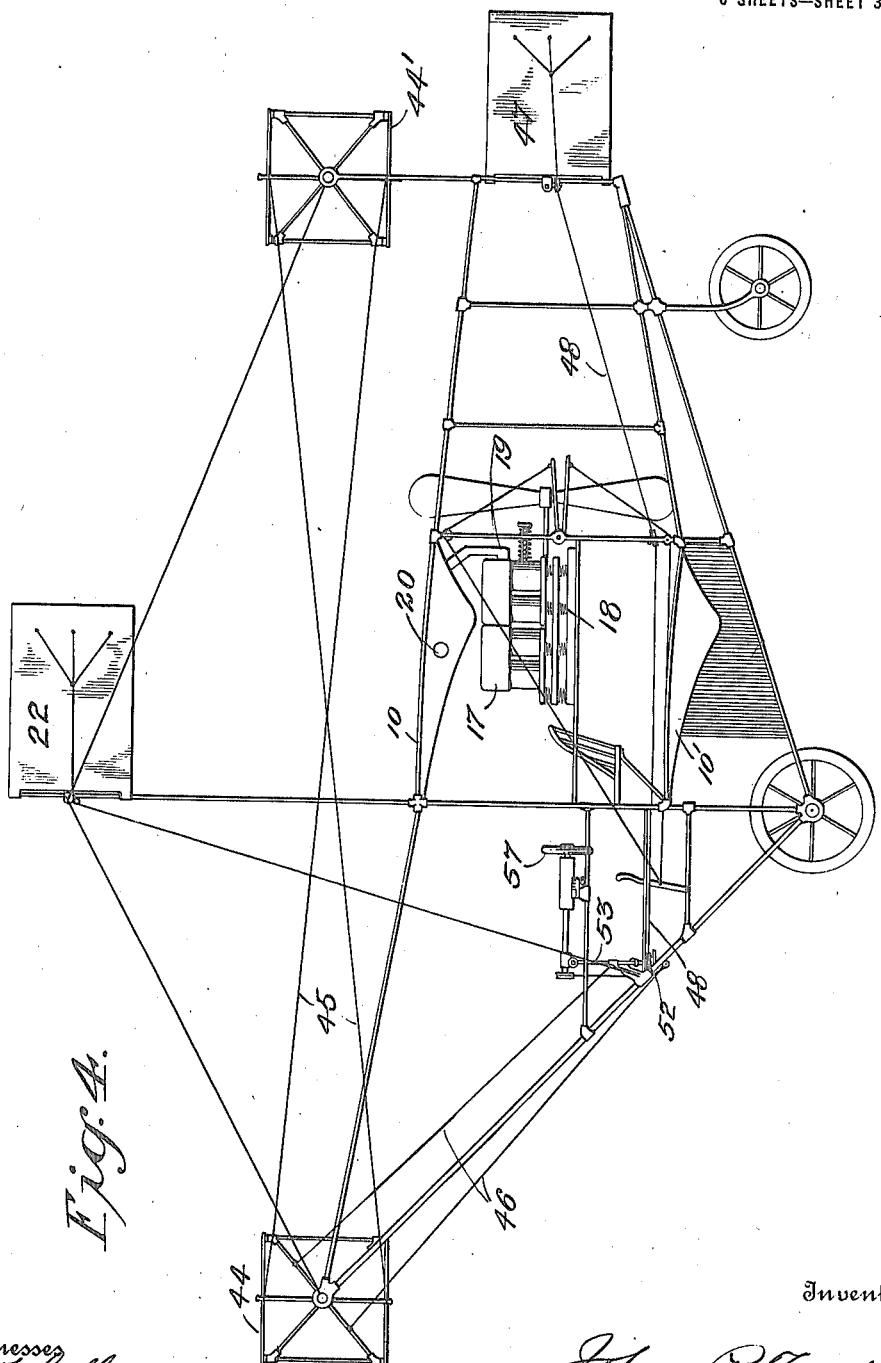

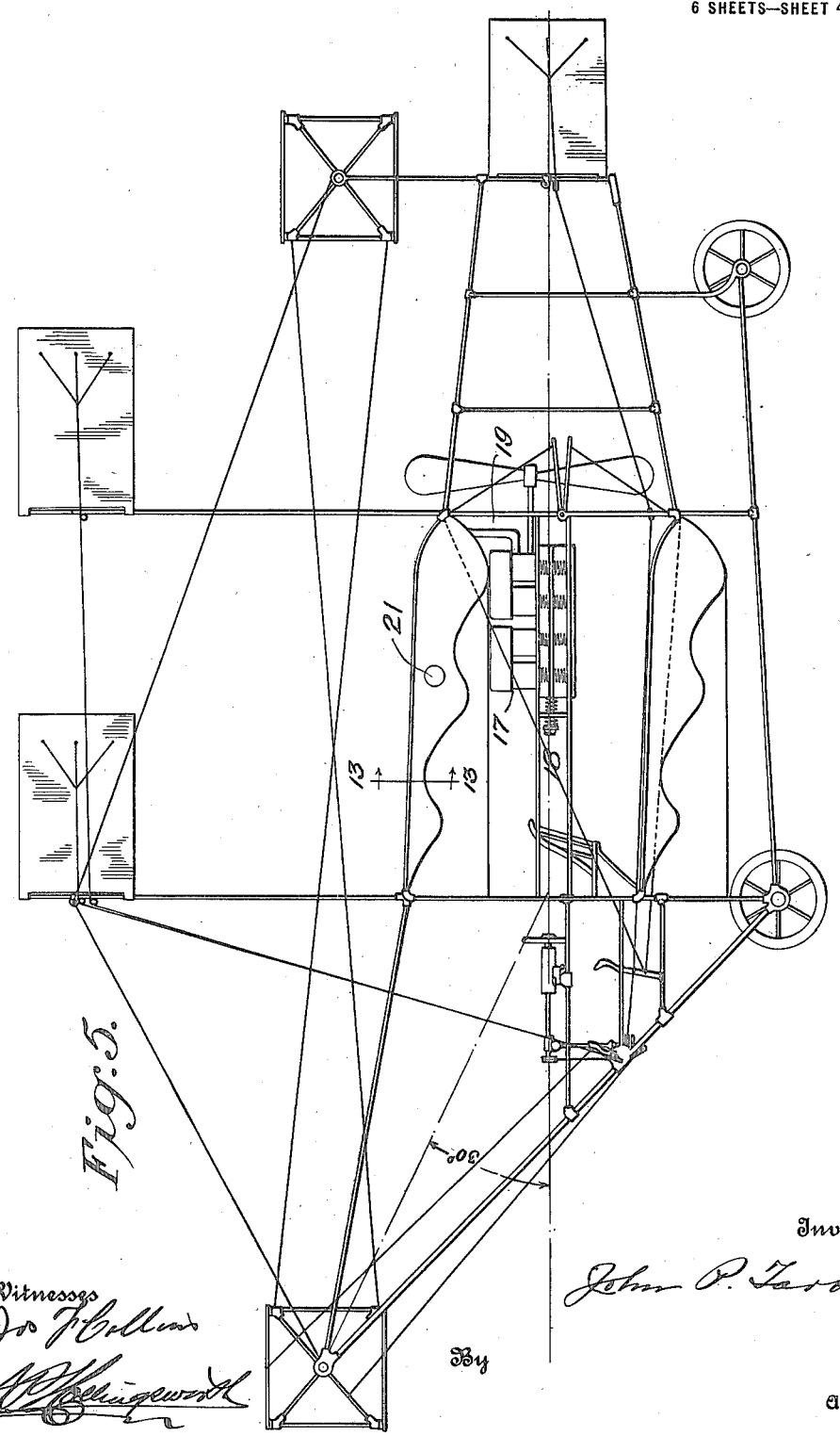

J. P. TARBOX.
AIRCRAFT.
APPLICATION FILED FEB. 10, 1911.
1,180,271.
Patented Apr. 18, 1916.
6 SHEETS—SHEET 5.
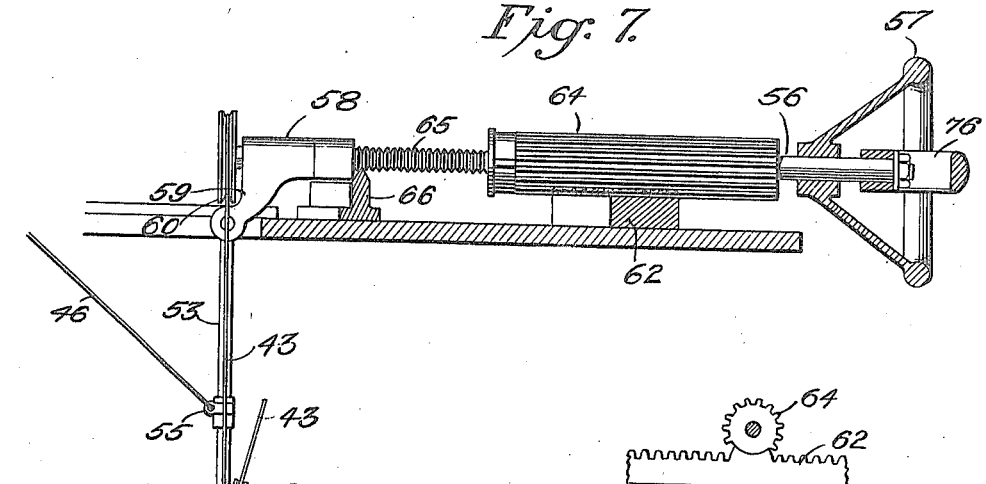
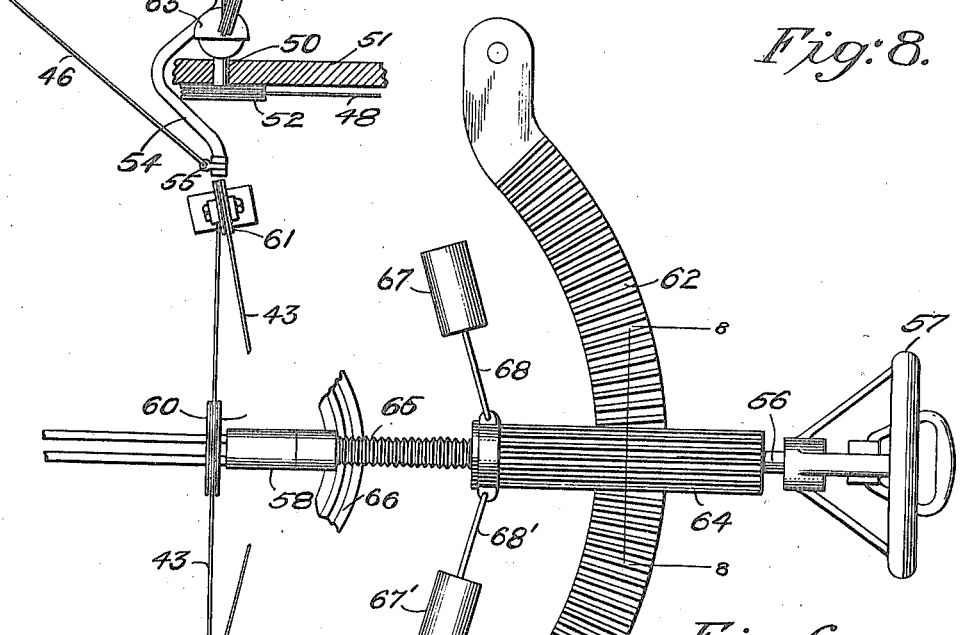

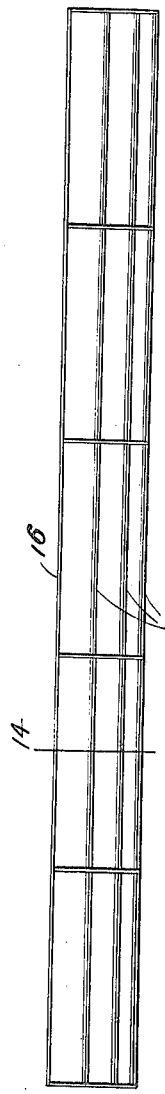
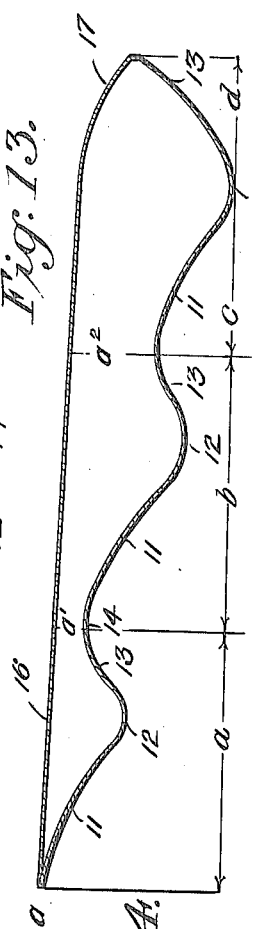
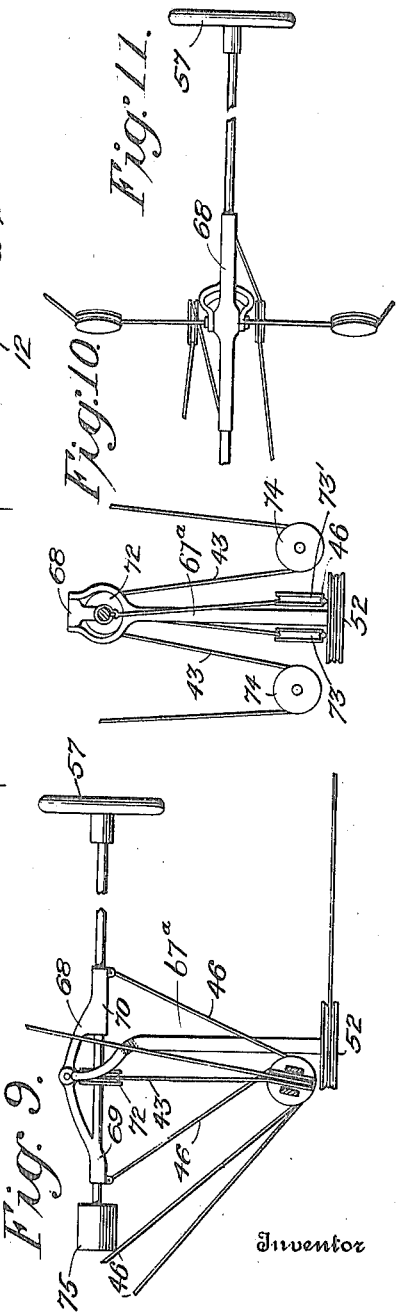

UNITED STATES PATENT OFFICE.

JOHN P. TARBOX, OF WASHINGTON, DISTRICT OF COLUMBIA, ASSIGNOR TO TARBOX SAFETY AIRCRAFT COMPANY, A CORPORATION OF DELAWARE.

AIRCRAFT.

1,180,271.      Specification of Letters Patent.      Patented Apr. 18, 1916.

Application filed February 10, 1911. Serial No. 607,735.

*To all whom it may concern:*

Be it known that I, JOHN P. TARBOX, a citizen of the United States, residing at Washington, in the District of Columbia, have invented new and useful Improvements in Aircraft, of which the following is a specification.

My invention has particularly to do with steering and balancing mechanism for aircrafts.

The especial object of my invention is to provide a mechanism of the character named which may be used most efficiently to maintain the balance of the craft under all conditions, and at the same time give ease and flexibility of the control of movement in all directions. This mechanism I show in the accompanying drawings in connection with an air-craft equipped with main planes, and with an arrangement of parts, and motormounting, however are not claimed herein, since they constitute divisible subjectsmatter and are to be claimed in separate applications in accordance with the usual practice.

Of the drawings, Figure 1 is a perspective of the air-craft equipped with the principal form of the steering mechanism and devices of my invention; Fig. 2 is a diagrammatic view showing the connections of the balancing mechanism and devices; Fig. 2ª is a diagrammatic side view; Fig. 3 is a diagrammatic view showing a modified form; Fig. 4 is a side elevation of another form; Fig. 5 is a side elevation of a still further modification; Fig. 6 and Fig. 7 are plan and elevation respectively of the operating end of the mechanism; Fig. 8 is a detail of the same, being a section on line 8—8 of Fig. 6; Figs. 9, 10 and 11 are side, front end and plan views of a modified form of operating mechanism; Fig. 12 is a front elevation of one of the main planes; Fig. 13 is a section of the same taken on line 13—13 of Fig. 5 and Fig. 14 is an enlarged section of the plane of Fig. 12 on line 14—14.

The control mechanism of my invention comprises a centrally located vertical laterally deflectable balancing plane mounted above or below the main body of the craft a considerable distance as subsequently defined, fore and aft elevating planes, a vertical lateral steering rudder, a speed checking brake plane and means for moving these several planes and rudders in a definite manner. In the preferred form of my invention I use vertical balancing planes both above and below the body of the craft, provide means whereby each balancing plane is normally free to fly with the wind, and provide operating means by which the upper and lower balancing planes may be simultaneously operated in opposite directions. In the embodiment I describe, I connect the upper and lower balancing planes by means of a differential gearing whereby the results named are accomplished, and whereby an equalization of the action of the balancing planes is secured. Vertical laterally deflectable balancing planes are most efficient in their action, and by reason of their freedom to fly with the wind, which they have according to my invention, all disturbance which might be caused by side winds is effectually avoided.

Referring to the drawings and particularly to Figs. 1, 2 and 3, it will be seen that I have illustrated my invention in connection with a machine of the biplane type. Upper and lower planes 10 and 10' are mounted on the frame 11 of a well-known form, the upper plane being substantially vertically above the lower plane. These planes have their under supporting surfaces formed in a peculiar manner. Referring to Fig. 14 it will be seen that they are made up of a series of similarly formed surface sections defined for the sake of illustration by letters $a$, $b$, $c$ and $d$. Each section is made up of an advance portion 11 curved as usual to give the proper lifting power, the curve being concave downwardly; a central portion 12 in the shape of a reversely curved surface, the curve being gradual; and thirdly an abrupt upwardly curved portion 13 leading from the gently curved portion 12 of the advance surface 11 to the beginning of the succeeding surface 11. Each surface 11 in succession begins at a point 14 a greater distance from the horizontal 16 than the preceding surface 11, these distances being marked $a'$, $a^2$ and $a^3$. The top of the plane is provided with a geometrically plain surface covering 16 extending from the advance edge of the first surface 11 to the rear end of the plane, the surface 16 being curved downwardly at the rear end 17 to meet the upwardly curved portion 13. Thus a wedge shaped plane is formed, which is capable of moving forward thin end first through the air at high velocity. These surfaces are proportioned according to the speed of the craft, the pitch of the surfaces 11, and the laws of compression of the air, none of which need be mentioned here. It is sufficient for an understanding of the present invention to say that by reason of the provision of the normally horizontal upper covering 16, the upper stratum of air is not disturbed, and that by virtue of the formation of the supporting under surface in stages 11, 12, 13 in series, the air which is compressed by the lifting surfaces 11 expands and impinges on the upwardly inclined surfaces 13 exerting pressure to force the craft forward. Thus a portion of the energy expended in compressing the air as the machine travels is recovered and used efficiently to drive the craft forward.

The craft is equipped with an engine 17, which is provided with a spring mounting 18 as shown. This spring mounting takes up vibration and prevents transmission of injurious jar and shock to the craft body. The engine is mounted with the driving shaft somewhat above the vertical center of resistance of the main planes alone as shown and for a purpose which I will mention presently. The exhaust of the engine is carried to the space within the main planes by exhaust pipe 19, as shown, discharging through two lateral openings 20 and 21, after traversing the distance from the center to each end of each plane. This gives additional supporting power, the gas being light, and in addition keeps the surfaces of the planes warm so that accumulation of ice and snow cannot take place.

The craft as thus embodied is equipped with the steering mechanism of my invention. Referring to the drawings, and first to Figs. 1 and 2 the mechanism and devices will be described. 22, 22' are upper and lower vertically pivoted laterally deflectable balancing planes. They are each pivoted on a vertical post or mast 23, 23' at the forward end. Their rear ends are free, but for the attachment of operating control cords 24, which extend from the point of attachment 25 laterally and forward, one to each end of a cross bar 26 secured rigidly one to each mast about the middle of the plane. The cords pass over pulleys 27, on the bars and those above down, and those below up, each to an outside element 28 of differential gear 29. The differential gears illustrated are of the type commonly appearing in automobile and other transmission and change speed gearing, but any known type of differential gearing, lever, screw or other, may be used with equal facility. These gears as shown comprise a central spider element 30 in the form of a cross. On the transverse arms of the cross are journaled the outside beveled gears 28, while on the vertical arms are journaled miter gears which mesh with the two outside gears in the well known manner. The showing is mainly diagrammatic since differentials of this type are so very well known. Movement of either outside gear 28, the central element 30 being held stationary, is transmitted to the other outside gear through the miter gears 30' the central element between them. When the central element 30 is rotated, and with it the miter gears 30', both of the outside elements 28 are rotated in the same direction, and to the same degree, providing their resistance to motion is the same, but to different degrees provided their resistance to motion is different. Moreover, at all times during which the movement of the central element 30 is under control there takes place an equalizing action between the outside elements 28 through the connecting miter gears 30'. Drums 28' are attached directly to outside gear elements 28 and the operating and control cords 24 are secured to these drums for operation by rotation of the drums through the gears. The cords 24 of the upper rudder 22 and the cords 24 of the lower rudder 22' are each connected with the corresponding drum 28' in the same manner, i. e. the right hand branch of cord 24 in each case passed to the same side (as illustrated the front) of the drum, while the left hand branch of the cord extends to the balancing rudders from the opposite side of the drum, (as illustrated in Fig. 2 from the rear side). Thus when the central element 30 of the gear is held stationary, the rudders 22 and 22' may move freely in unison in the same linear direction, right or left. This serves a very useful purpose as will subsequently appear.

To the right and left of the craft are balancing planes 32, 32' of the Curtiss type. Any other known type of balancing devices adapted to be located at the sides of the craft may be used. Operating cords 33 extend from points of attachment 34 on these planes to outside elements 35 of differential gear 36 in all respects similar to the differential gear 29 just described, being connected to drums 35' of these gears as in the case of the vertical balancing devices. As is clearly apparent from Fig. 2 these two outside balancing planes 32, 32' are connected to the corresponding drums 35', 35' in a manner entirely similar to the connection of the planes 22, 22' to the drums 28', 28'. Thus planes 32, 32' may also move freely at all times in the same linear direction, up or down, in unison.

The central elements 30 and 37 of the differentials are connected together by worm gearing 38 (Fig. 2ª) operable through a control shaft 39 extending forwardly in proximity to the control mechanism, (see Fig. 1), and connected therewith by control cords 43 (Figs. 1 and 7). This control mechanism is presently to be described. Thus while the sets of planes have the free movements in unison in the same vertical or lateral direction (the horizontal set in the vertical directions and the vertical set in the lateral directions), through the gear 38 they may all be simultaneously moved angularly clockwise or counterclockwise to govern the balance of the craft.

44, 44' are two elevating planes, fore and aft of the craft. These planes are pivotally mounted as usual to turn about central axes transversely of the craft. They are mounted not in the central horizontal plane of the craft but each considerably above and each the same distance above the central horizontal plane of the craft. Preferably they are mounted above the top supporting surface of the craft (Fig. 5) and on lines making 30° with the central horizontal plane of the craft and extending to the front and rear of the craft respectively. Crossed operating cords, 45, connect them together for simultaneous operation in opposite directions. From the front planes 44 control cords 46 extend to the steering gear.

47 is a vertical lateral steering rudder mounted aft, and preferably aft of the rear planes 44'. It is pivoted at its forward end vertically. Operating cords 48, extend from point of attachment 49 forward to the steering mechanism (see Fig. 7 and Fig. 1).

The steering mechanism is especially adapted for the operation of the steering and balancing devices specified. It consists of a stationary vertical rotatable post 50 located centrally of the operating platform 51, and a drum 52 on this post and to which cords 48 from the vertical steering rudder are connected. On the upper end of this post by a ball and socket joint is pivoted by its lower end a lever 53. To this lever are connected operating cords 46 of the elevating planes 44 44', and the lever being provided with a branch 54 for this purpose, the branch extending downwardly and then rearwardly to a point substantially in line with the post 53. The cords are connected on each side of the ball and socket joint at equal distances from the joint, and are secured to members 55, swiveled on the lever and branch so that the lever and branch may be turned and not wind the cords, 46.

Hinged to the upper end of lever 53 is a second lever 56, horizontal, and extending rearwardly, terminating in an operating hand wheel 57. The end of the horizontal lever 56 terminates in swiveled handle 76, whereby the lever may be held in a given plane, with one hand grasping the handle, without disturbing rotation by hand wheel 57 when desired. The lever is rotatable by means of the hand wheel in an extended bearing 58 in the rear end of hinge member 59. In the form of hinge shown the member 59 is pivoted to the lever 53 below the axis of the lever 56 and substantially in the vertical plane containing the lever 53 and the operating drum 60 keyed on the end of lever 56. The control cords 43 of the balancing devices are connected to this drum 60, passing over pulleys 61 mounted closely adjacent to and one on each side of the ball and socket joint of the lever 53, and post 50, or else directly to shaft 39 as shown in Fig. 1. The lever 56 extends over a fixed horizontal arc shaped rack member 62 concentric with the vertical line of the joint 63. The rack is blank in the middle, and a mutilated pinion 64 fixed on lever 56 normally engages by its mutilated portion this blank portion which is socketed to receive it. The mutilated pinion and rack constitute a lost motion device, between the lever 53, (the turning of which operates the rear vertical rudder 49 through post 50, drum 52, and cords 48) and the lever 56 which operates the balancing devices through connections 43 et seq., for when the wheel 57 is turned the lever 56 is first simply rotated, but as the motion progresses the pinion 64 engages the rack 62, and the lever 56 is given an angular movement about lever 53, and turning the same. The body of the lever at 65 between the pinion and the hinge is circumferentially grooved for a small distance. An arc shaped check 66 concentric with rack 62 engages in these grooves when the pinion 64 rests upon the rack. Horizontally hinged dashpots 67 and 67' on each side of and connected to rod member 56 by rods 68 and 68' damp forward and right and left movement of the lever, but permit free rotary movement.

The operation:—Under way in a forward direction the craft will be controlled and directed in its movements by the mechanism and devices described. The lever 56 is held in the hands of the operator by means of the swiveled handle 76, thus being free normally to be rotated through movements of the balancing devices due to shifting of pressures upon them. The hand wheel is not grasped unless desired to shift the balancing devices—being normally allowed to slip freely through the hand as the lever 56 turns. By moving the lever 56 to right or left, lifting it the while clear of the rack member 63, the vertical steering rudder 47 may be moved right and left to steer the craft right and left. By moving lever 56 straight forward and back with or without lifting from the rack, the craft may be pointed downwardly or upwardly. The long pinion 64 permits this movement without itself becoming disengaged from the rack 62. The arc shaped member 66 engaging in the grooves 65 on the lever hold it in any forward or backward position to which it may be moved as long as the lever is rested upon the rack 62, thus serving to rest the operator and relieve the muscle tension otherwise necessary. The member 66 simply ratchets from groove to groove if the lever 56 is moved by force, but if 56 is raised slightly the movement is entirely free, until the lever is lowered again. By rotating the lever 56 lifted free of the rack 63 the four balancing devices may be moved simultaneously clockwise and counterclockwise, to balance the craft. By giving the lever 56 compound movement, comprising several of the above movements, the craft may be moved downward or upward, and to right or left simultaneously on any oblique course and maintained balanced at the same time. By rotating the hand wheel 57 without lifting the lever 56 from the rack, to right or left, with pinion 64 in engagement with rack 62 instead of free from it, the balancing devices may be moved to give the craft a list preparatory to turning to right or left, and the craft turned, the lost motion device of 62 and 64 by reason of the permitted preliminary rotation of the shaft 56 insuring a movement of the balancing devices to list the craft before the lever 56 is moved laterally by rotative engagement of the pinion with the rack to move the vertical rudder 47. And the greater the angle of turn to right or left the greater the list as established by movement of the balancing devices. As soon as the craft has the requisite list or earlier the lever 56 may be lifted from the rack and the balancing devices moved to counteract continued listing. The operation of the balancing devices should have special note. They are connected by the cords to the differential gears as shown and as described in such a manner that when the hand wheel is turned to right and left they all turn together clockwise or anticlockwise. That is, the vertical planes 22, 22' above and below are turned always in opposite directions by the central element of gear 29, and the side balancing devices 32, 32' are also moved correspondingly in opposite directions by the turning of the same element of gear 36. A simple inspection of Fig. 2 and tracing of the cords 24 will make this entirely clear. Furthermore these planes by virtue of the differential gears and by virtue of the swiveled handle 76 are normally free to fly with the wind at all times. Normally the wind action is the same on opposite vanes, and therefore even when the hand wheel 57 is grasped they are then free to fly in unison with the wind when it changes direction. As long as the lever 56 is grasped only by the swiveled handle 76 however, (and this is normally the case) it matters not whether the wind action is the same on opposite vanes or not, for they are then free to rotate the shaft 56, and take up dissimilar positions. In other words, the planes of the vertical pair may normally each fly to right or left laterally, and the planes of the horizontal pair fly up or down both in the same direction to the same degree with all freedom, the outside gears 28 and 35 of the differentials simply moving in opposite directions with respect to the central elements 30 and 37 to the same degree, or to different degrees with a resulting movement of the central elements and lever 56 if the wind pressures on them are unequal. In this movement the bevel gears 30', 37' have a rotative movement or a combined revolutionary and rotative movement as is usual in this type of gears. When however, the hand wheel 57 is grasped and revolved the central elements 30, 37 are turned and the outside elements 28 and 35 are each moved in the same direction through the revolutionary movement of the central members 30, 37 and hence move the balancing devices in opposite directions. The latter movements may be equal or unequal in extent, depending on the relative resistance of the balancing devices to movement, any inequality of resistance being at once annulled through the equalizing rotative movement of the gears 30', 37' of the central element. And after movement as soon as the hand wheel is released they are again free to fly with the wind, as previously described. The vertical planes 22, 22' thus take at all times a direction resulting from a compounding of the direction and velocity of the craft and the direction and velocity of the wind, and thus is made possible the use of a form of balancing device long recognized as very efficient. For they are by this mechanism rendered free from influence of cross currents and may be made to give positive and uniformly applied corrective action under deflection at all times. By virtue of the use of the four balancing devices in combination one at each of four points, in case one or more is in an air pocket the others are most liable to be acting fully, and balance under the most severe conditions is assured. Moreover the balancing action of any two opposite ailerons is equalized. In case of failure of power due to any cause, and a loss of control, the elevating planes may be simply moved to the dotted line position shown in Fig. 1, and the balancing devices held stationary and the craft will come down right side up. This is due to the action of the air on the elevating planes inclined downward and toward the center of gravity above the same, and to the reactive surface constituted by the upper balancing plane 22 also above the center of gravity and free from the upper surface of the machine.

My invention may be given other forms within its scope, some of which I show.

In Fig. 3 is shown diagrammatically an air craft equipped with the vertical balancing planes 22, 22' of my invention only, the side balancing devices 33, 33' being omitted. The parts are numbered like the parts of Fig. 1 and the operation and arrangement will be clearly understood. It is to be noted that both planes 22, 22' are well above and below the top and bottom of the craft and that they are of the same effective area, the surface area being greater on the plane nearest the craft, because there is less leverage for that one (see Fig. 1).

In Fig. 4 is shown in side elevation a craft equipped with only one of the vertical planes, the differential gear being omitted. In this case the hand wheel 57 is normally allowed to slip through the one hand by which it is turned, as the variation in wind pressure on the plane 22 tends to turn it, the lever 56 being held on the other hand by the swiveled handle 76. Preferably the plane is at the apex of a triangle formed by 45° lines from the tips of the main planes (see Fig. 1). In going around a curve, if the plane 22 is simply held stationary, as the craft turns to right or left, the effect will be to list the craft to right or left the proper amount to prevent skidding. A moment's consideration will show that the automatic listing is due to the side action of the air on the plane 22 as the turn commences, and that it is automatic. The incline may be increased or diminished and the craft righted after a turn by simply turning hand wheel 57. By virtue of the 45° elevated position of the plane 22 blanketing of it by a main plane on a turn is effectively prevented.

In the form shown in Fig. 5, there are used two planes 22 one at the front of the main plane and one at the rear and connected for simultaneous operation from the wheel 57. By this use of two planes 22 the resultant balancing forces are applied on a line passing through the center of gravity and center of resistance. This form is shown equipped with the planes having full form, of Fig. 14. The depth of the planes from front to rear may be many feet and the value of the longitudinal arrangement of the balancing devices will therefore be appreciated.

In Figs. 9 to 11 I show a modified form of control means. An upwardly extended substantially vertical rotatable post 67ª is used, free from joints, instead of short post 50 and the lever 53. On the lower end of this post is the operating drum 52 for the vertical lateral steering rudder. The upper end is forked, and hinged between the upper ends of the fork is an upwardly bowed support 68, hinged at its middle and having outer bearings 69 and 70. Operating shaft 56 is rotatably journaled in these bearings. Between the prongs of the fork of post 67ª and with its top substantially tangent to the hinge axis is a control drum 72 for operating cords 43 to the balancing devices. Control cords 46 to the elevating planes 44, 44' are attached one to each end of the hinged support 68. Cords 46 pass downward and over pulleys 73, 73' in line with the foot of the post. Cords 43 pass downward and over pulleys 74, 74' or may be connected to shaft 39 as shown in Fig. 1. An operating hand wheel 57 is provided as before, and the weight of the shaft 56 and wheel 57 is counterbalanced by weight 75 on the forward projecting end of the shaft. The hand wheel 57 may be made of the form shown in Figs. 6 and 7 and an additional swiveled grip 76 provided as shown in Figs. 6 and 7. The great advantage of such a control in combination with the balancing devices described is extreme simplicity and ease of action and flexibility. All of the movements of all the steering devices may be controlled by the single operating device, 56, 57, or 71, 57. It is particularly to be noted that in the form of Figs. 9, 10 and 11, the control is effected by their movements up and down for elevation, right and left for lateral steering, and rotative for balancing. A moment's consideration will show that these movements are most readily carried out by an operator who has one hand on the swiveled grip 76, and the other on the wheel 57, which normally moves freely through it, and the wheel over his lap and in front of him. All of the movements are approximately in one plane, and great force may be applied with ease. No weight of the devices falls upon the operator.

In order to exert a retarding or breaking influence on the machine when desired, I preferably employ the means shown in Figs. 1, 4 and 5, consisting of two pairs of planes, one pair upon each side of the longitudinal axis of the machine. Each pair consists of an upper plane 100 and a lower plane 101, normally lying close together and in the plane of flight, as shown in Fig. 1. These planes are pivoted at their forward edges at 102 and are operated by lever 103 connected by cords, one to each plane, these cords passing over pulleys 104 and 105. A single lever 103 may operate both sets of plates for the purpose of moving the individual planes of each pair simultaneously in opposite directions so as to constitute a drag or air brake, or two levers may be provided, one for each pair, and operated individually to steer or help steer the craft right or left.

While I have shown and described the best forms of my invention now known to me I desire to cover in the annexed claims all the forms of my invention which come within its legal scope.

I claim—

1. In combination an air-craft, a vertical laterally deflectable balancing plane a certain distance above the craft, a similar plane of the same effective area a different distance below the craft, and means for simultaneously deflecting the said planes in oppsite directions, the areas of said planes being in the ratio of said distances to each other.

2. An air-craft comprising a main supporting surface, balancing means, lateral steering means, means for operating the balancing means, means for operating the lateral steering means, and a lost motion connection between said two operating means.

3. In an air-craft, laterally balancing devices, means for operating the same, lateral steering means, means for operating the same, and a mutilated gearing connection between said two operating means.

4. A steering gear comprising a fixed vertical rotatable post, a lateral steering rudder connected thereto for operation through rotation of the post, a substantially vertical lever hinged to said post, elevating planes connected to said lever, a horizontal lever hinged to said vertical lever, and balancing devices connected to said horizontal lever, said horizontal lever being adapted for movement to control each of the several steering devices connected to the mechanism simultaneously.

5. In an air craft, the combination with a supporting member, of a pair of balancing surfaces each pivotally mounted in a vertical plane one above and the other below said supporting member, and an interlocking connection between said surfaces permitting their simultaneous movement in the same direction under influence of lateral air pressure.

6. In an air craft, the combination with a supporting member, of a pair of balancing surfaces pivotally mounted one above and the other below said supporting member each upon an axis substantially normal to the longitudinal axis of the craft, a differential connecting said surfaces for mutual movement in the same direction under influence of lateral air pressure, and means for setting said surfaces in opposite directions.

7. In an air craft, the combination with a supporting member, of a pair of balancing surfaces pivotally mounted in a vertical plane cutting the longitudinal axis of the craft and one above and the other below said supporting surfaces, a differential connecting said surfaces for mutual movement in the same direction under influence of lateral air pressure, and means for moving said differential to set said surfaces in opposite directions.

8. In an air craft, the combination with a supporting member, of balancing surfaces each pivotally mounted one above and the other below said supporting member to exert a torque about the longitudinal axis of the craft, and a connection between said surfaces including means for setting said surfaces to opposite angles of incidence to exert a torque about said longitudinal axis in one direction or the other and to permit the simultaneous movement in the same direction under influence of lateral air pressure.

9. In an air craft, the combination with a supporting surface, of a pair of balancing surfaces one at each side thereof, a pair of balancing surfaces mounted one above and the other below said supporting surface, all of said surfaces being pivotally mounted so as to be capable of exerting a torque about the longitudinal axis of the craft, and connection between said surfaces including means for setting the members of each pair of balancing surfaces to opposite angles of incidence to exert a torque about said longitudinal axis of the craft in the same direction while permitting the simultaneous movement of the members of each pair of surfaces in the same direction under influence of variation in air pressure.

10. In an air-craft in combination, main supporting surfaces therefor, a multiple number of balancing devices in different planes, differential gearing connecting the balancing devices in the same plane together for simultaneous mutual operation in the same direction, and gearing connections between the differential gears, whereby all of the balacing devices may be given cooperating balancing movement at the same time.

11. An air craft comprising a main supporting means, a vertical laterally deflecting balancing plane above and below the main plane, differential gearing connecting them for free movement in unison in the same linear direction, and manually operable means connected with the said differential gearing for manually operating the said balancing planes at will in opposite linear directions.

12. An air craft comprising main supporting surfaces, a vertical laterally deflecting balancing plane above said supporting surfaces, a similar balancing plane below the supporting surfaces, differential gearing connecting said balancing planes for free movement in unison in the same direction, and supporting means connected with said differential gearing to controllably move the balancing planes in opposite directions simultaneously.

13. In an air-craft, a steering mechanism comprising a vertically disposed lever pivotally connected at its lower end to the main frame of the craft and capable of oscillatory and rotary movement in a determinate plane, and a hand-wheel journaled on the upper end of said lever on an axis at an angle to the aforesaid lever and having a rotary movement with respect thereto, together with means for balancing the aircraft laterally, means for steering the aircraft up and down, and means for steering right and left, and connected each with said mechanism to be operated through a different one of the aforesaid movements thereof.

14. In an air craft, a steering mechanism comprising a vertically disposed lever pivotally mounted at its lower end and capable of oscillatory and rotary movements, a second lever hinged to said vertical lever and extending in the general direction of the longitudinal axis of the craft, a hand-wheel for rotating said second lever, a swiveled grip upon said second lever adjacent said hand-wheel, a rack-and-pinion connection for oscillating said second lever about said vertical lever as a center, and means operated by the movements of said levers for steering the craft right and left, for steering up and down, and for laterally balancing the craft.

15. In an air craft, a steering mechanism comprising a vertically disposed lever pivotally mounted at its lower end upon the craft and capable of oscillatory and rotary movements, a horizontal lever for oscillating said second lever and hinged to said vertical lever and mounted for rotation with respect thereto, a hand wheel upon said second lever, a rack-and-pinion connection for oscillating said lever when rotated in either direction, and a stop connection operated when said rack and pinion are in engagement for preventing the movement of said second lever to oscillate said vertical lever.

16. In an air craft, a steering mechanism comprising a vertically disposed lever pivotally mounted at its lower end for oscillatory and rotary movements, a horizontal lever pivotally mounted upon said vertical lever and capable of longitudinal movement to oscillate said vertical lever, and a stop device operative to prevent the longitudinal movement of said horizontal lever when in one of its extreme positions but inoperative when rocked upon its pivot thereby permitting the oscillation of said vertical lever.

17. In an air craft, a steering mechanism comprising a single control lever capable of longitudinal, rotary and oscillatory movements, a hand-wheel mounted upon said lever for operating the same, and a swiveled hand grip mounted upon said lever adjacent said hand-wheel.

18. In an air craft, a steering mechanism comprising a vertically disposed lever pivotally mounted at its lower end and capable of oscillatory and rotary movements, a horizontal lever pivotally mounted upon said vertical lever and capable of longitudinal, rotary and oscillatory movements, a rack-and-pinion connection for causing the oscillation of said horizontal lever when rotated, a hand-wheel upon said horizontal lever for operating the same, and a swiveled hand grip upon said horizontal lever adjacent said hand-wheel.

19. In an air craft, the combination with right-and-left steering device, up-and-down steering device, and lateral balancing devices, of steering mechanism comprising a vertically disposed lever pivotally and swivelly mounted at its lower end, a hand-wheel journaled on the upper end of said lever on an axis at an angle to the aforesaid lever and capable of rotary movement, and connections for operating said right and left steering device by the swivel motion of said lever, said up and down steering device by the pivotal movement of said lever, and said balancing devices by the rotary movement of said hand-wheel.

In testimony whereof I have hereunto set my hand in presence of two subscribing witnesses.

JOHN P. TARBOX.

Witnesses:
THOMAS DURANT,
WM. E. TUCKER.